United States Patent
Berstis et al.

(10) Patent No.: US 7,207,003 B1
(45) Date of Patent: Apr. 17, 2007

(54) METHOD AND APPARATUS IN A DATA PROCESSING SYSTEM FOR WORD BASED RENDER BROWSER FOR SKIMMING OR SPEED READING WEB PAGES

(75) Inventors: Viktors Berstis, Austin, TX (US); Lorin Evan Ullmann, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1270 days.

(21) Appl. No.: 09/652,365

(22) Filed: Aug. 31, 2000

(51) Int. Cl.
*G06N 3/00* (2006.01)
(52) U.S. Cl. .................................................. 715/526
(58) Field of Classification Search ................ 715/513, 715/501, 203, 525, 500, 532, 517, 523, 530, 715/526, 527; 709/218, 225, 219; 235/462, 235/472; 707/9
See application file for complete search history.

(56) References Cited

U.S. PATENT DOCUMENTS

| | | | |
|---|---|---|---|
| 4,985,697 A | 1/1991 | Boulton | 340/750 |
| 5,663,748 A | 9/1997 | Huffman et al. | 345/173 |
| 5,778,402 A * | 7/1998 | Gipson | 715/530 |
| 5,870,608 A | 2/1999 | Gregory | 395/708 |
| 5,930,809 A | 7/1999 | Middlebrook | 707/501 |
| 5,966,703 A | 10/1999 | Burrows | 707/2 |
| 5,996,011 A * | 11/1999 | Humes | 709/225 |
| 6,212,534 B1 * | 4/2001 | Lo et al. | 715/511 |
| 6,286,001 B1 * | 9/2001 | Walker et al. | 707/9 |
| 6,477,529 B1 * | 11/2002 | Mousseau et al. | 707/5 |
| 6,510,458 B1 * | 1/2003 | Berstis et al. | 709/219 |
| 2001/0020244 A1 * | 9/2001 | Belanger et al. | 707/530 |

FOREIGN PATENT DOCUMENTS

| | | |
|---|---|---|
| EP | 0 935 193 | 11/1999 |
| JP | 10320390 | 12/1998 |

OTHER PUBLICATIONS

Mansfield, Ron, "Mastering Word 97: Fourth Edition," Sybex, pp. 93-94.*

* cited by examiner

*Primary Examiner*—Stephen Hong
*Assistant Examiner*—Kyle Stork
(74) *Attorney, Agent, or Firm*—Duke W. Yee; David A. Mims, Jr.; Rakesh Garg (57) ABSTRACT

A method and apparatus in a data processing system for modifying content of a document. A request is received for modified content. The document is compressed using a set of rules, wherein selected content in the document is removed to increase a speed at which a user can read the document.

24 Claims, 7 Drawing Sheets

DeleteWord { // used if delete words defined in GUI          900

//init constructor
　DeleteWord (int length, int syllable, int Difficulty, int attribute)

//data
　int byLength;
　int bySyllable;
　int byDifficulty;
　int byAttribute;
　Vector removeFullWords;
　Vector removeStartsWithWords;

//methods
　void setFullWord (String word) { }
　void setStartsWith (String word) { }
　boolean delete Word (String word) {
　　　//compare length, difficulty, attrributes
　　　//compare with removeFullWords list
　　　//compare with removeStartsWithWords list
　　　//return true or false void setWord (String word) {
//used by the GUI to add words to delete (or extended by Keep Class below)
//add to Vector
}
void setStartsWithWord (String word) {
//used by-the GUI to add words
//add to Vector
}

FIG. 9B

```
ReplaceWords { // used if replace words defined in GUI
  //data
  Hashtable wordsToBeReplaced
      //key=word to be replaced
      //value=replacement word
  //methods
  boolean replace (String word) {
      //check hash to decide return true
  }
  void setReplacement (String wordToBeReplace, replacement) {
//used by the GUI to add words
  }
  String getReplacement (String word) { }
}
KeepWords { // used if keep words defined in GUI
    extends DeleteWords //init constructor
    KeepWords (int length, int syllable, int Difficulty, int attribute)

//methods boolean keepWord (String word) {
        //compare length, difficulty, attributes
        //compare with removeFullWords list
        //compare with removeStartsWithWords list
        //return true or false

```
CompressionHelper {

//methods
String getReplacement (word){ };

int getNumSyllables (String word) { return numberOfSyllables }
    int getWordLength (String word) { return wordLength )
    int getDifficulty (String word) { return GradeLevelDifficulty }
    int getAttributes (String word) //bold=1, underline=2, italic=3, etc.
      { return VectorOfAttributes //data
boolean isPartOfWordRemoveList = DeleteWords.deleteWord (word);
boolean isPartOfWordKeepList  = KeepWords.keepWord (word);
boolean isPartOfWordReplaceList = ReplaceWords.deleteWord (word);

//init Constructors
CompressionHelper(String word) { };
CompressionHelper(String [ ] words) { };

```
//String getModifiedContent (String OriginalContentInFileFormat) {
    //create InputStream from OrginalContentIFile
    //create InputStream for ModifiedContentOutputFile
    //loop through all words
        ifWordOnDeleteList //create CompressionHelper classes with each word to be
analyzed in parallel with reading the unmodified file content. After caching the
compression helpers away, the boolean flags can be used to determine how the
modified content is rendered (word removed, word replaced, word remains intact).
        and NOT on isWordOnKeepList OR isWordOnReplaceList
            //delete word
            //break next word
        else IfOnKeeplist AND NOT on WordReplaceList
            //break next word
        else //OnWordReplacelist
            //replace word Write result to ModifiedContentOutoutFile

}
```

METHOD AND APPARATUS IN A DATA PROCESSING SYSTEM FOR WORD BASED RENDER BROWSER FOR SKIMMING OR SPEED READING WEB PAGES

BACKGROUND OF THE INVENTION

1. Technical Field

The present invention relates generally to an improved data processing system and in particular to a method and apparatus for handling documents in a data processing system. Still more particularly, the present invention provides a method and apparatus for modifying a web page to facilitate skimming or speed reading of the web page.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

More and more businesses and individuals are placing web pages and other types of content on the Internet. The amount of information available on the Internet has become extremely large. Search engines are present, which identify content that a user may desire. These search engines, however, may return hundreds of pages in response to a query. This amount of information often times causes user frustration because of the large number of web pages that a user must review to find desired content. Some search engines may organize the content based on how closely the content corresponds to the query or based on subject matter. Still, the user must review the pages until the desired content is found.

Therefore, it would be advantageous to have an improved method and apparatus for quickly reviewing the content of web pages.

SUMMARY OF THE INVENTION

The present invention provides a method and apparatus in a data processing system for modifying content of a document. A request is received for modified content. The document is compressed using a set of rules, wherein selected content in the document is removed to increase a speed at which a user can read the document.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
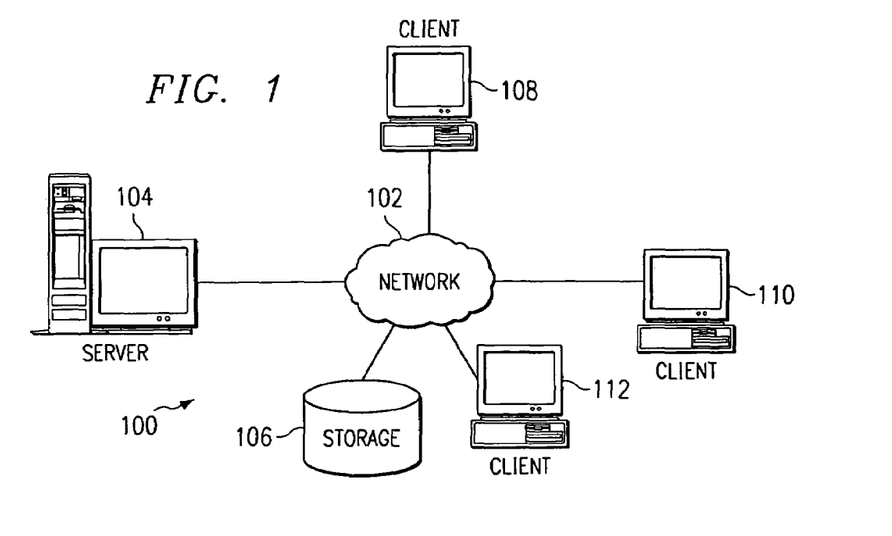
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
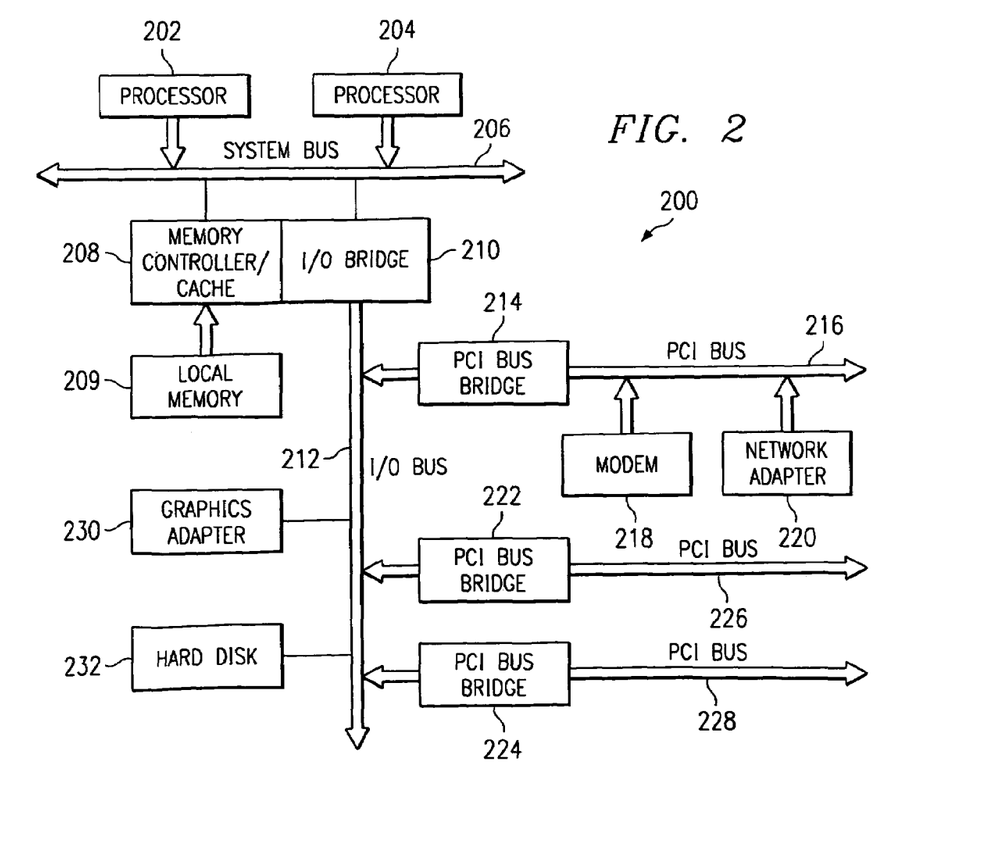
FIG. 2 is a block diagram of a data processing system that may be implemented as a server, such as a server in FIG. 1, in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
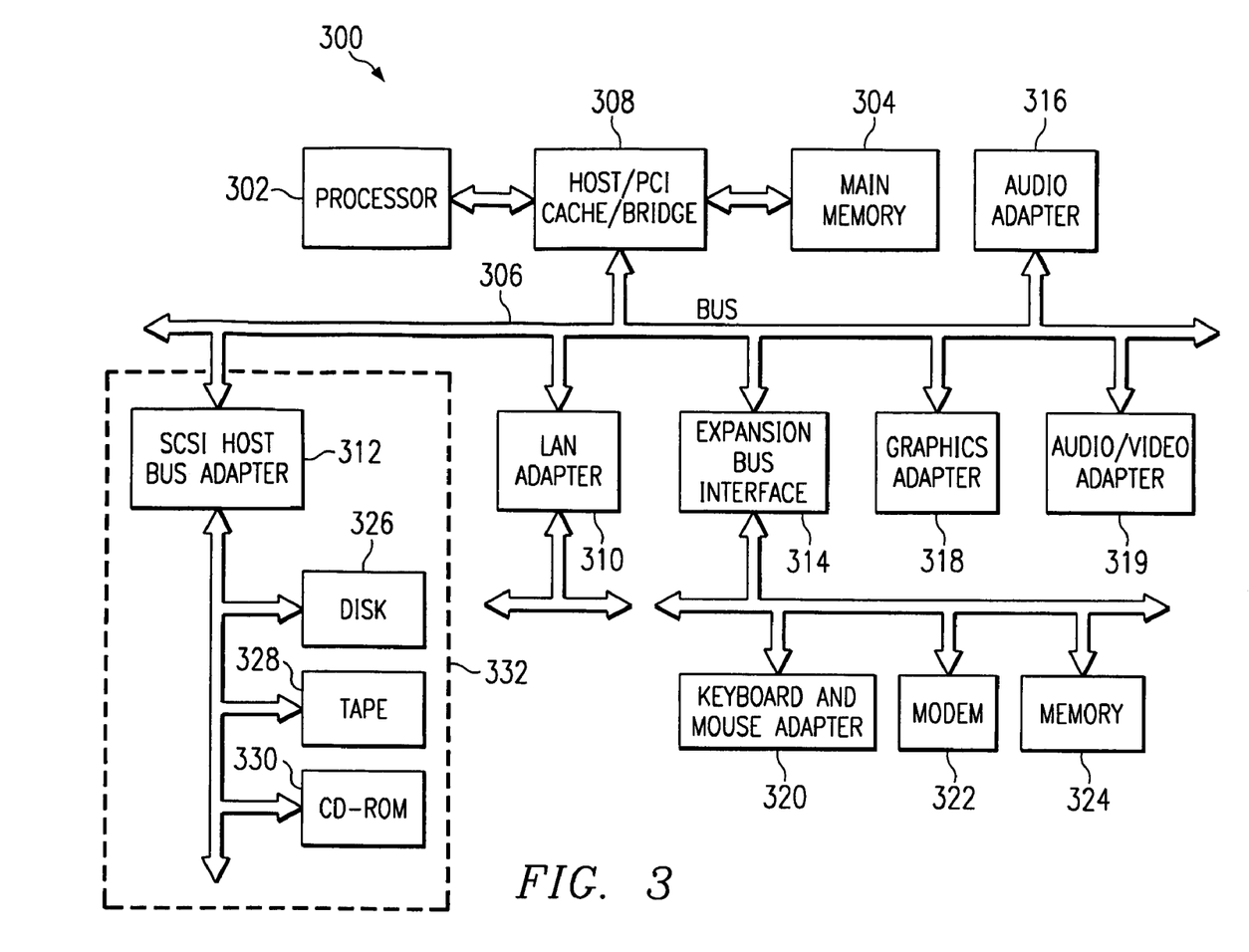
FIG. 3 is a block diagram illustrating a data processing system in which the present invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an improved method, apparatus, and computer implemented instructions for allowing a user to skim or speed read a web page. The present invention recognizes that no mechanism is present to compress content in a document, such as a web page, without degrading readability of the message by the user and without changing the physical and spatial characteristics of the original document. Currently available compression techniques are mainly used to improved storage of data, communication time, and performance. These mechanisms, however, change the physical relationships between text and graphical objects on a web page.

The mechanism of the present invention modifies content to display some words while making other words invisible. A content's message to the user is maintained to retain the meaning of the content, mainly the amount of information displayed. Just as a public speaker modifiers his/her delivery based on his/her audience, this mechanism compresses content based on is user's interests or abilities obtained via configuration content before the content is displayed.

The mechanism of the present invention allows for skimming or speed reading of a web page by making trivial words invisible to increase the speed by which information on a web page may be read or comprehended by user. The amount of improvement in speed at which information can be read by user depends on the cognitive skills of the particular user. For example, words that are made invisible or stay visible may be selected based on the educational level of difficulty, the length, or the function of the word in the sentence. Other information, such as the number of pages reviewed per minute by user, word compression statistics, and the amount of data skimmed may be used in identifying words that are to be visible or made invisible.

Figure 4:
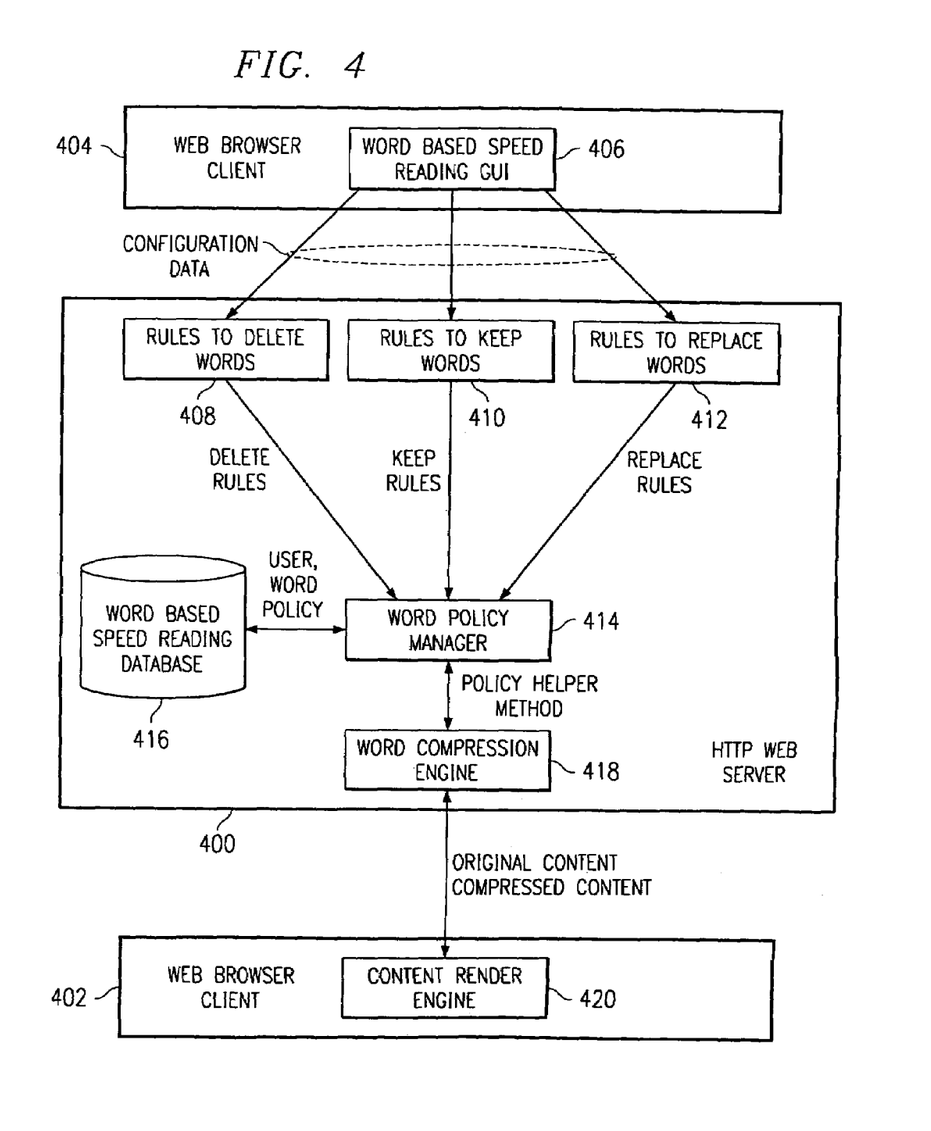
FIG. 4 is a diagram illustrating data flow in a word based speed reading system in accordance with a preferred embodiment of the present invention.

Turning next to FIG. 4, a diagram illustrating data flow in a word based speed reading system is depicted in accordance with a preferred embodiment of the present invention. In this example, server 400 is an HTTP web server and may be implemented using a server, such as data processing system 200 in FIG. 2. In this example, server 400 may modify or alter content for use in a web browser 402, which is located on a client, such as client 110 in FIG. 1. Browser 402 make be implemented using know browser applications, such Internet Explorer, which is available from Microsoft Corporation.

The various settings or rules used to alter content may be set using browser 404. This browser as browser 402 or a different browser. Also, browser 404 may be located on the same client, such as client 110, or on a different client, such as client 108 in FIG. 1.

In particular, word based speed reading graphical user interface (GUI) 406 is a user interface used to set up and alter rules in server 400 used to modify or alter content in a document, such as a web page. In these examples, the rules include rules to delete words 408, rules to keep words 410, and rules to replace words 412. Rules to delete words 408 are used to identify words that can be deleted or made invisible in a document. Rules to keep words 410 are used to identify words in a document that should be retained or made visible. Rules to replace words 412 are used to identify words that may be replaced with alternate words to make the readability or comprehension of the word easier. Word policy manager 414 may take selections of these rules made through word based speed reading GUI 406 to generate a profile or word policy for a particular user. In the depicted examples, the word policy is a data structure containing the various rules and words received and selected from word based speed reading GUI 406. Different word policies and users associated with these word policies are stored in word based speed reading database 416.

In this example, browser 402 sends a request to modify a web page for a user. This request is received by word compression engine 418 in server 400. In this example, the request includes a user identification as well as the web page to be modified. The web page is sent from a content render engine 420 in web browser 402 to word compression engine 418. Based on the identification received in the request, a word policy for a user is retrieved from word based speed reading database 416 by word policy manager 414 and for use by a policy helper method, which aids word compression engine 418 in analyzing various words in the web page to modify or compress the web page to facilitate faster comprehension of the content in the web page. In these examples, the policy helper method used by word compression engine 418 is a compression helper method. Using this policy helper method, word compression engine 418 modifies the web page to generate modified or compressed content. This modified content is then returned to content render engine 420 for display to the user. In the depicted examples, the modified or compressed content retains the physical and spatial characteristics of the original document.

Figure 5:
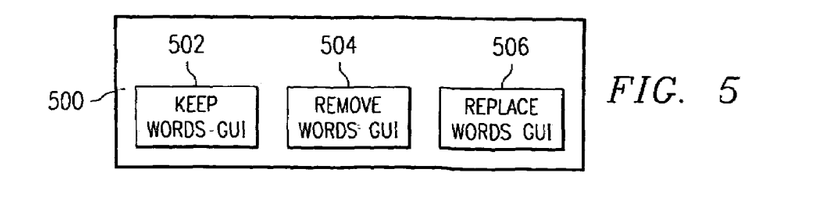
FIG. 5 is a diagram of a graphical user interface (GUI) for generating rules for word based speed reading in accordance with a preferred embodiment of the present invention.

Turning next to FIG. 5, a diagram of graphical user interface GUI for generating rules for word based speed reading is depicted in accordance with a preferred embodiment of the present invention. GUI 500 is an example of a GUI that may be presented to a user to generate and select rules for a word policy. In this example, GUI 500 includes buttons, 502, 504, and 506 for a keep key words GUI, a remove words GUI and replace words GUI, respectively. Selection of one of these buttons result in an appropriate GUI to be displayed for generating or modifying a word policy.

Figure 6:
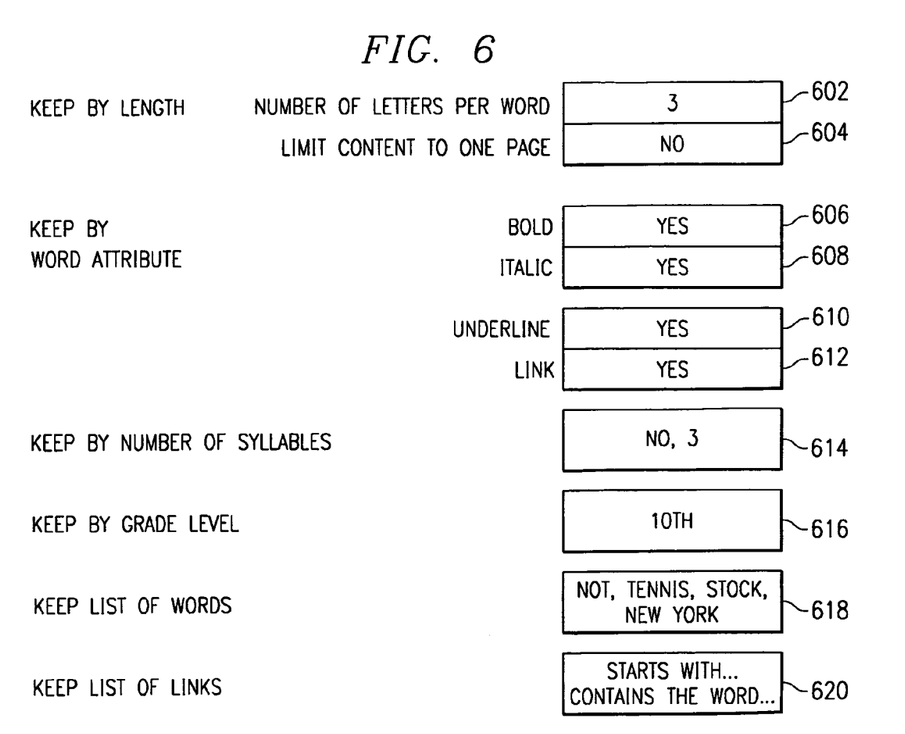
FIG. 6 is an example GUI for keeping words in accordance with a preferred embodiment of the present invention.

Turning next to FIG. 6, an example GUI for keeping words is depicted in accordance with a preferred embodiment of the present invention. Keep words GUI 600 may be presented in a variety of ways to a user. In this example, an HTML page is used to enter selections and data for words that are to be kept in a document. Fields 602 and 604 provide for input regarding the number of letters per word and limitations to the content. As illustrated, the default for an number of words is three in field 602 and content is not limited to one page as shown in field 604. Fields 606–612 allow for words to be retained based on a word attribute. In these examples, the attributes are bold, italics, underlined, and link. The default is to keep words with these attributes. Keep words GUI 600 also allows for words to be kept or retained in the document based on the number of syllables in a word using field 614. In this example, the number of syllables is three as a default value.

Next, field 616 allows for words to be retained by grade level. The default here is for the tenth grade. When checking for words by grade level, much like known systems used in checking spelling and checking grammar editors. Additionally, field 618 allows a list of words to be entered for a user in which these words will be retained if present in the document. Field 620 allows for a list of links to be entered in which these links will be retained. The list of links may be specified in a number of different ways. For example, links starting with a particular word or containing a particular word may be ones that are retained.

Figure 7:
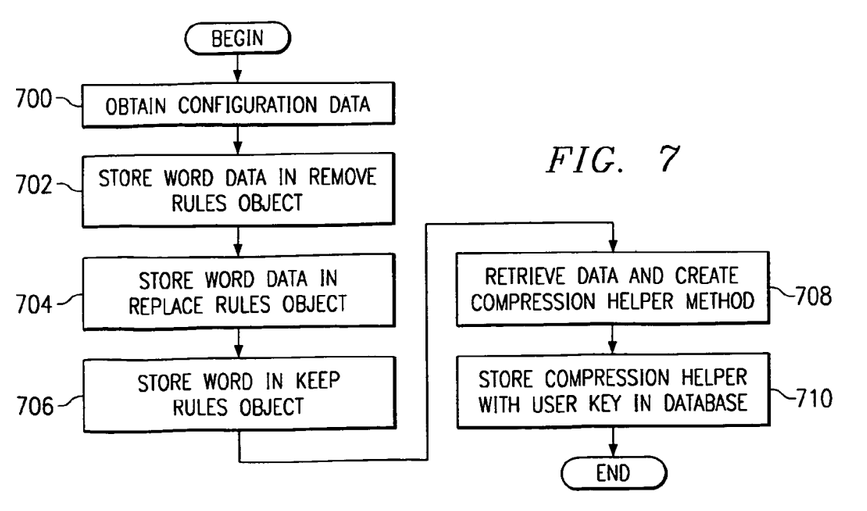
FIG. 7 is a flowchart of a process used by a word policy manager to generate word policies and policy helpers in accordance with a preferred embodiment of the present invention.

Turning next to FIG. 7, a flowchart of a process used by a word policy manager to generate word policies and policy helpers is depicted in accordance with a preferred embodiment of the present invention. In this example, the illustrated process may be implemented in a word policy manager, such as word policy manager 414 in FIG. 4.

The process begins by obtaining configuration data (step 700). This configuration data may be received from a web browser through an interface, such as word based speed reading GUI 406. This GUI displays appropriate pages for entry or selection of rules used to keep words, remove word, and/or replace words. Based on the configuration data obtained, word data is stored in a remove rules object, such as rules to delete words 408 in FIG. 4 (step 702). Next, data obtained from the interface is stored in a replace rules object, such as rules to replace words 412 in FIG. 4 (step 704). Configuration data also may be stored in a keep rules object, such as rules to keep words 410 in FIG. 4 (step 706). The data stored in these objects is retrieved and a compression helper method is then created (step 708). The compression helper is then stored in a database along with a user key (step 710) with the process terminating thereafter. In this example, the database may be word based speed reading database 416 in FIG. 4.

Figure 8:
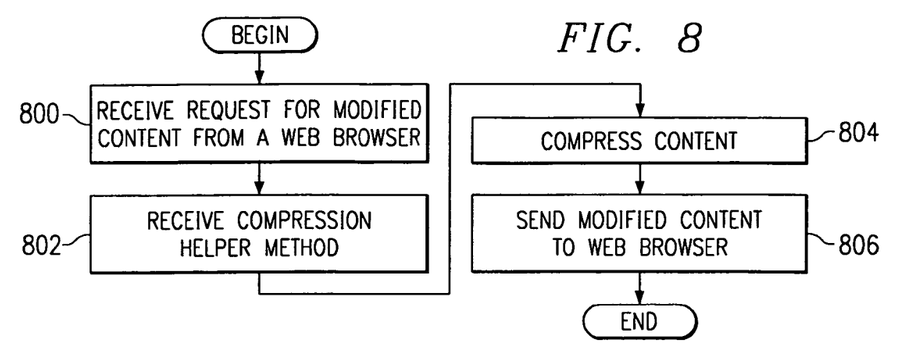
FIG. 8 is a flowchart of a process used to generate a modified document in accordance with a preferred embodiment of the present invention.

Turning next to FIG. 8, a flowchart of a process used to generate a modified document is depicted in accordance with a preferred embodiment of the present invention. The process in FIG. 8 may be implemented in word compression engine 418 in FIG. 4. The process begins by receiving a request for modified content from a web browser (step 800). In this example, the request includes an identification of a user as well as the unmodified content, such as one or more web pages. Next, a compression helper method is received (step 802). This method in these examples is received from a word policy manager, such as word policy manager 414 in FIG. 4. The content is then compressed using the compression helper method (step 804). In compressing the content, in these examples, the compression consists of displaying some words while other words are deleted or undisplayed. In deleting words, the physical and spatial characteristics of the original document remain intact in these examples. The modified content is then returned to the web browser (step 806) with the process terminating thereafter.

Figure 9A:
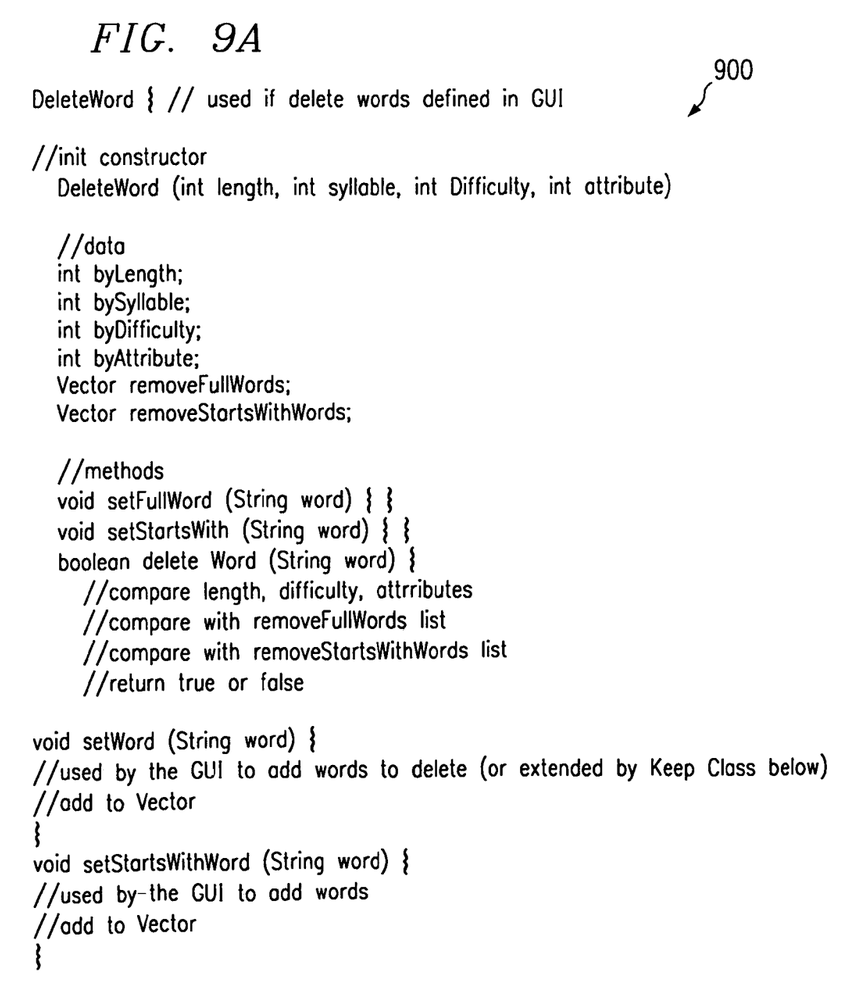
FIGS. 9A and 9B together are an illustration of a word policy in accordance with a preferred embodiment of the present invention.
Figure 9B:
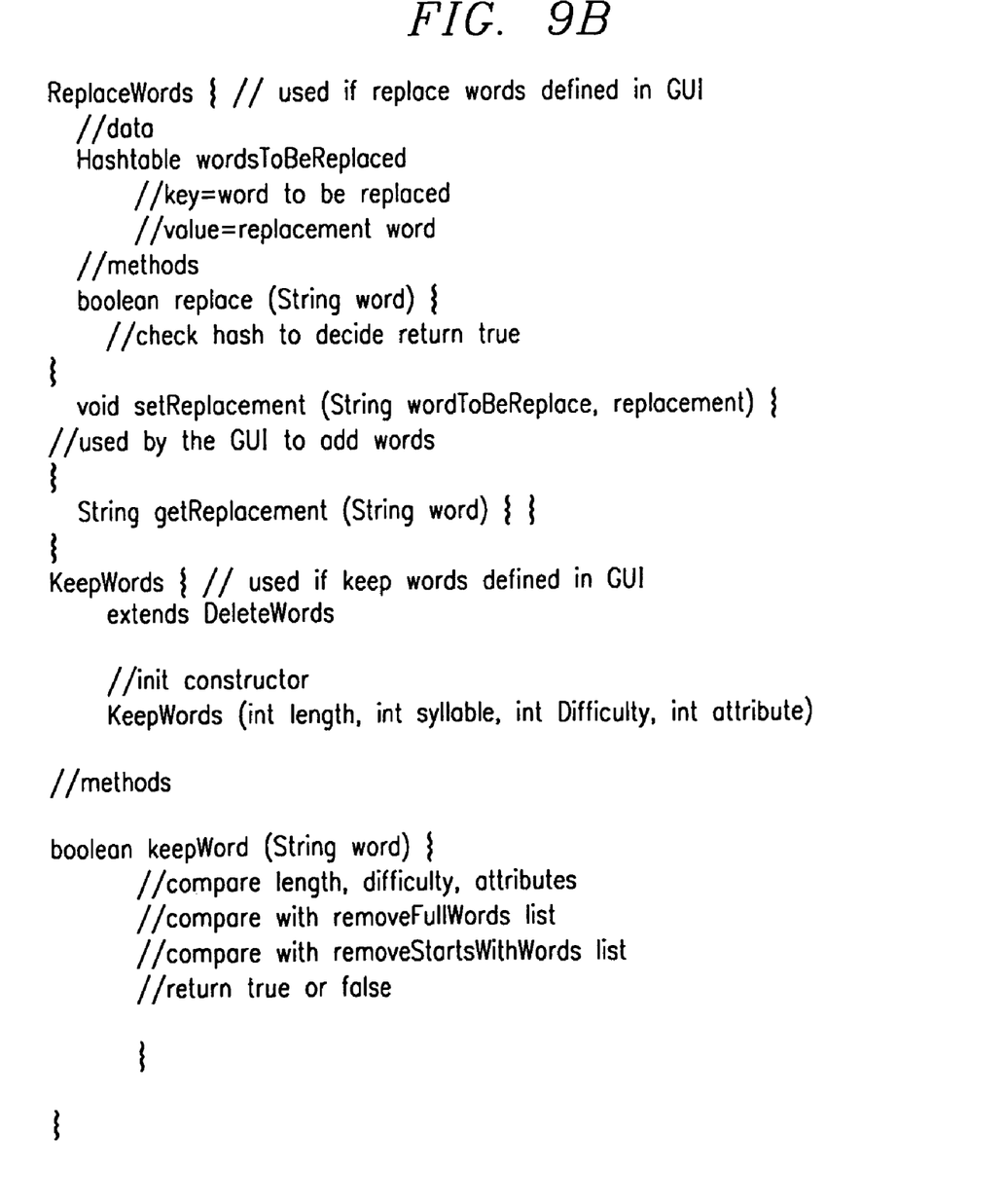

With reference now to FIGS. 9A and 9B, an illustration of a word policy is depicted in accordance with a preferred embodiment of the present invention. Data structure 900 is an example of a word policy, representing rules and words that are to be considered in modifying or compressing a document. Data structure 900 in this example is implemented as a class that provides the different rules as well as a list of words to be deleted. Data structure 900 also references a word list, which is used by the policy helper method to aid word compression engine 418 in analyzing words to modify the web page. The word list represents words that should be removed or made invisible in the document in this example. Of course, data structure 900 may contain integers or other symbols representing words to be deleted.

Similar data structures are used to represent words to be kept or replaced. When replacing words, the data structure may also include the words or symbols for words to be replaced as well as the replacement words.

Figure 10:
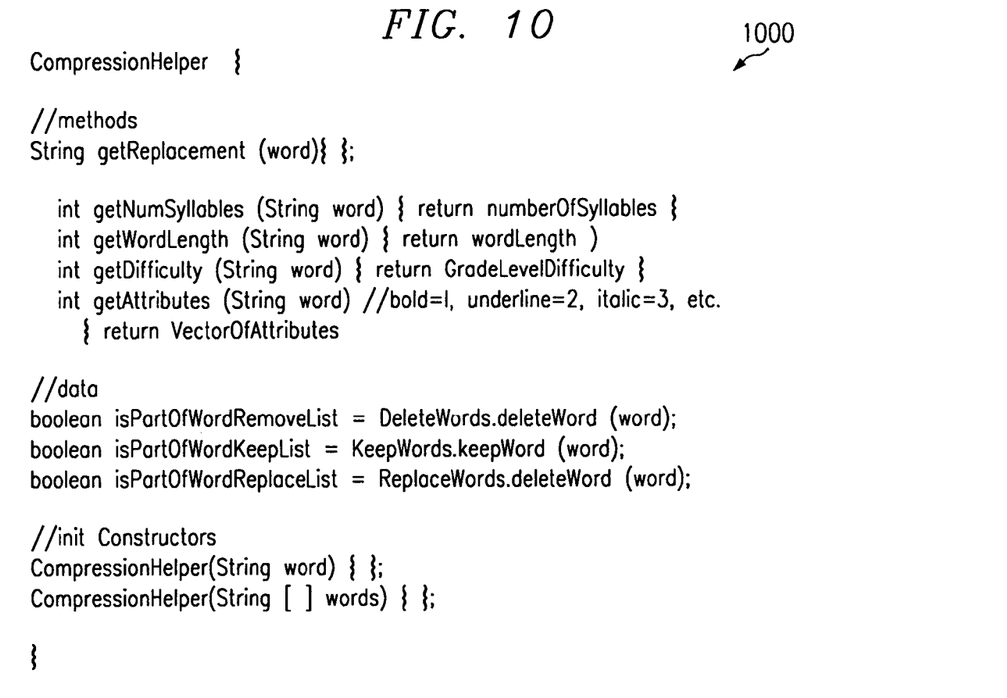
FIG. 10 is a diagram illustrating a compression helper method in accordance with a preferred embodiment of the present invention.

Turning next to FIG. 10, a diagram illustrating a compression helper method is depicted in accordance with a preferred embodiment of the present invention. In this example, compression helper method 1000 takes the form of a class, which aids a compression engine, such as word compression engine 418 to analyze words. In this example, the method is implemented as a Java method.

Figure 11:
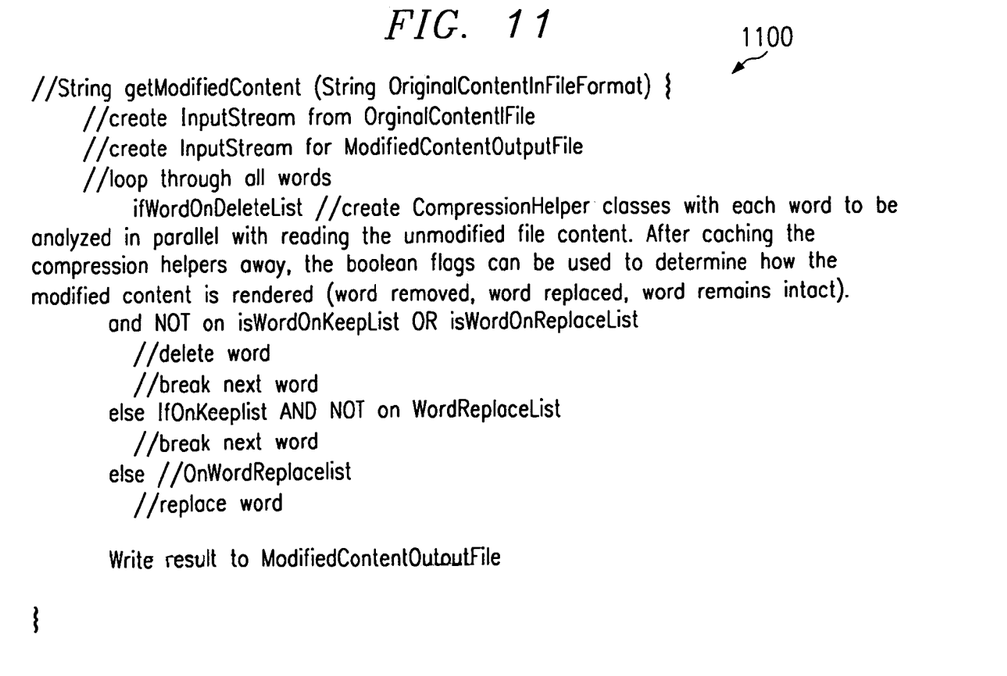
FIG. 11 is a diagram illustrating a code segment for modifying a document in accordance with a preferred embodiment of the present invention.

With reference now to FIG. 11, a diagram illustrating a code segment for modifying a document is depicted in accordance with a preferred embodiment of the present invention. Method 1100 illustrates example code used to receive content for modification, modifying the content, and placing the modified content in a file. In these examples, method 1100 is a Java method. The code in method 1100 creates a compressionHelpers which use query the DeleteWord, ReplaceWord and KeepWord classes in order to determine how to whether or not to display the word (or a replacement).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the processes for modifying a document are illustrated as being located in a web server, these processes may be implemented in a number of different places. For example, these processes may be located on the same data processing system as the web browser. Further, these processes also may be integrated as part of a web browser. The processes may be implemented as a plug-in or filter for the web browser in such an implementation. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for modifying original content of a document, the method comprising:
   receiving a request for modified content;
   in response to each receipt of said request, modifying said original content, using a set of rules to make selected content in said document invisible without degrading readability of said document to form a modified document, wherein rules in the set of rules comprise one of a rule to make words invisible, a rule to retain words, and a rule to replace words, wherein the rule to retain words comprises one or more of logic to keep by length, logic to keep by word attribute, logic to keep by number of syllables, logic to keep by grade level, logic to keep list of words, or logic to keep list of links, wherein one or more rules are selected from the set of rules to form a word policy, wherein one or more word policies are associated with one or more users and stored in a word policy database, wherein unmodified content in said modified document retaining its original physical and spatial characteristics after a portion of said content is modified, and wherein the selected content in the document being retained, replaced, or made invisible increases a speed at which a user can read the modified document relative to a speed at which at which the user can read the document without modifications; and
   displaying said modified document having said original physical and spatial characteristics for the unmodified content.

2. The method of claim 1, wherein the document is a web page.

3. The method of claim 1, wherein the document is a hypertext markup language document.

4. The method of claim 1, wherein the receiving step and the modifying step are performed in a server data processing system.

5. The method of claim 1, wherein the receiving step and the modifying step are performed in a client data processing system.

6. A method in a data processing system for altering original content for a web page containing a set of words, the method comprising:
   receiving a request to alter the original content of said web page;
   in response to each receipt of said request, altering said original content by reducing the set of words in the web page to generate a modified content of said web page to make some of said set of words invisible without degrading readability of said web page to form an altered web page, wherein rules in the set of rules comprise one of a rule to make words invisible, a rule to retain words, and a rule to replace words, wherein the rule to retain words comprises one or more of logic to keep by length, logic to keep by word attribute, logic to keep by number of syllables, logic to keep by grade level, logic to keep list of words, or logic to keep list of links, wherein one or more rules are selected from the set of rules to form a word policy, wherein one or more word policies are associated with one or more users and stored in a word policy database, wherein unaltered content in said altered web page retaining its original physical and spatial characteristics after a portion of said original content is altered, wherein the set of words is reduced by making said some of said set of words invisible using a set of rules, wherein said set of words in the web page being retained, replaced, or made invisible increases a speed at which a user can read the altered web page relative to a speed at which the user can read the web page without alterations; and wherein the set of words in the modified web page retains key words allowing identification of the content of the web page.

7. The method of claim 6, wherein the web page is a hypertext markup language document.

8. The method of claim 6, wherein the receiving step and the altering step are performed in a server data processing system.

9. The method of claim 6, wherein the receiving step and the altering step are performed in a client data processing system.

10. A data processing system comprising:
    a bus system;
    a communications adapter connected to the bus, wherein the communications adapter provides for data transfer to and from the data processing system;
    a memory connected to the bus system, wherein the memory includes a set of instructions; and
    a processor unit connected to the bus, wherein the processor unit executes the set of instructions to receive a request to alter original content of a web page and reduce the set of words in the web page, in response to each receipt of said request to make selected content of said original content invisible without degrading readability of said web page to form an altered web page, wherein unaltered content in said altered web page retaining its original physical and spatial characteristics after a portion of said original content is altered, wherein the set of words is reduced using a set of rules, wherein rules in the set of rules comprise one of a rule to make words invisible, a rule to retain words, and a rule to replace words, wherein the rule to retain words comprises one or more of logic to keep by length, logic to keep by word attribute, logic to keep by number of syllables, logic to keep by grade level, logic to keep list of words, or logic to keep list of links, wherein one or more rules are selected from the set of rules to form a word policy, wherein one or more word policies are associated with one or more users and stored in a word policy database, and wherein the set of words being reduced increases a speed at which a user can read the altered web page relative to a speed at which the user can read the web page without alterations; and wherein the set of words in the altered web page retains key words allowing identification of the content of the web page.

11. The data processing system of claim 10, wherein the bus system includes a primary bus and a secondary bus.

12. The data processing system of claim 10, wherein the processing unit comprises one processor.

13. The data processing system of claim 10, wherein the processing unit comprises a plurality of processors.

14. A data processing system for modifying original content of a document, the data processing system comprising:
    receiving means for receiving a request for modified content;
    in response to each receipt of said request, modifying means for modifying said original content, using a set of rules, to make selected content in said document invisible without degrading readability of said document to form a modified document, wherein rules in the set of rules comprise one of a rule to make words invisible, a rule to retain words, and a rule to replace words wherein the rule to retain words comprises one or more of logic to keep by length, logic to keep by word attribute, logic to keep by number of syllables, logic to keep by grade level, logic to keep list of words, or logic to keep list of links, wherein one or more rules are selected from the set of rules to form a word policy, wherein one or more word policies are associated with one or more users and stored in a word policy database, wherein unmodified content in said modified document retaining its original physical and spatial characteristics after a portion of said original content is modified, and wherein the selected content in the document being retained, replaced, or made invisible increases a speed at which a user can read the modified document relative to a speed at which the user can read the document without modifications; and displaying means for displaying said modified document having said original physical and spatial characteristics for the unmodified content.

15. The data processing system of claim 14, wherein the document is a web page.

16. The data processing system of claim 14, wherein the document is a hypertext markup language document.

17. The data processing system of claim 14, wherein the receiving means and the modifying means are located in a server data processing system.

18. The data processing system of claim 14, wherein the receiving means and the modifying means are located in a client data processing system.

19. A data processing system for altering original content for a web page containing a set of words, the data processing system comprising:

receiving means for receiving a request to alter original content;

in response to each receipt of said request, altering means for altering said original content by reducing the set of words in the web page to generate a modified web page to make some of said set of words invisible without degrading readability of said web page to form an altered web page, wherein rules in the set of rules comprise one of a rule to make words invisible, a rule to retain words, and a rule to replace words, wherein the rule to retain words comprises one or more of logic to keep by length, logic to keep by word attribute, logic to keep by number of syllables, logic to keep by grade level, logic to keep list of words, or logic to keep list of links, wherein one or more rules are selected from the set of rules to form a word policy, wherein one or more word policies are associated with one or more users and stored in a word policy database, wherein unaltered content in said altered web page retaining its original physical and spatial characteristics after a portion of said original content is altered, wherein the set of words is reduced using a set of rules, and wherein the set of words in the web page being retained, replaced, or made invisible increases a speed at which a user can read the altered web page relative to a speed at which the user can read the web page without alterations; and wherein the set of words in the modified web page retains key words allowing identification of the content of the web page.

20. The data processing system of claim 19, wherein the web page is a hypertext markup language document.

21. The data processing system of claim 19, wherein the receiving means and the altering means are located in a server data processing system.

22. The data processing system of claim 19, wherein the receiving means and the altering means are located in a client data processing system.

23. A computer program product in a computer readable medium for use in a data processing system for modifying original content of a document, the computer program product comprising:

instructions for receiving a request for modified content;

in response to each receipt of said request, instructions for modifying said original content, using a set of rules, to make selected content in said document invisible without degrading readability of said document to form a modified document, wherein rules in the set of rules comprise one of a rule to make words invisible, a rule to retain words, and a rule to replace words, wherein the rule to retain words comprises one or more of logic to keep by length, logic to keep by word attribute, logic to keep by number of syllables, logic to keep by grade level, logic to keep list of words, or logic to keep list of links, wherein one or more rules are selected from the set of rules to form a word policy, wherein one or more word policies are associated with one or more users and stored in a word policy database, wherein unmodified content in said modified document retaining its original physical and spatial characteristics after a portion of said original content is modified, and wherein the selected content in the document being retained, replaced, or made invisible increases a speed at which a user can read the modified document relative to a speed at which the user can read the document without modifications; and instructions for displaying said modified document having said original physical and spatial characteristics for the unmodified content.

24. A computer program product in a computer readable medium for use in a data processing system for altering original content for a web page containing a set of words, the computer program product comprising:

instructions for receiving a request to alter the original content;

in response to each receipt of said request, instructions for altering said original content by reducing the set of words in the web page to generate a modified web page to make some of said set of words invisible without degrading readability of said web page to form an altered web page, wherein unaltered content in said altered web page retaining its original physical and spatial characteristics after a portion of said original content is altered, and wherein the set of words is reduced using a set of rules, wherein rules in the set of rules comprise one of a rule to make words invisible, a rule to retain words, and a rule to replace words, wherein the rule to retain words comprises one or more of logic to keep by length, logic to keep by word attribute, logic to keep by number of syllables, logic to keep by grade level, logic to keep list of words, or logic to keep list of links, wherein one or more rules are selected from the set of rules to form a word policy, wherein one or more word policies are associated with one or more users and stored in a word policy database, and wherein the set of words in said web page being retained, replaced, or made invisible increases a speed at which a user can read the altered web page relative to a speed at which the user can read the web page without alterations; and wherein the set of words in the modified web page retains key words allowing identification of the content of the web page.

* * * * *